US010038336B2

United States Patent
Oh et al.

(10) Patent No.: US 10,038,336 B2
(45) Date of Patent: Jul. 31, 2018

(54) POWER DUPLICATION APPARATUS FOR HVDC SYSTEM AND CONTROL METHOD THEREFOR

(71) Applicant: HYOSUNG CORPORATION, Seoul (KR)

(72) Inventors: Jae-Hoon Oh, Incheon (KR); Hyo-Jin Kang, Seoul (KR)

(73) Assignee: HYOSUNG CORPORATION, Seoul (KR)

( * ) Notice: Subject to any disclaimer, the term of this patent is extended or adjusted under 35 U.S.C. 154(b) by 210 days.

(21) Appl. No.: 15/109,009

(22) PCT Filed: Dec. 26, 2014

(86) PCT No.: PCT/KR2014/012870
§ 371 (c)(1),
(2) Date: Jun. 29, 2016

(87) PCT Pub. No.: WO2015/102312
PCT Pub. Date: Jul. 9, 2015

(65) Prior Publication Data
US 2016/0329740 A1     Nov. 10, 2016

(30) Foreign Application Priority Data

Dec. 30, 2013    (KR) ........................ 10-2013-0167883

(51) Int. Cl.
*H02J 7/00*      (2006.01)
*H02J 9/06*      (2006.01)
(Continued)

(52) U.S. Cl.
CPC ................ *H02J 9/061* (2013.01); *H02J 1/10* (2013.01); *H02J 3/36* (2013.01); *H02J 7/007* (2013.01); *Y02E 60/60* (2013.01)

(58) Field of Classification Search
USPC ........................................ 307/66, 46, 48, 50
See application file for complete search history.

(56) References Cited

U.S. PATENT DOCUMENTS

| 7,439,634 B2 * | 10/2008 | Michalko | H02J 4/00 307/43 |
| 2004/0119454 A1 * | 6/2004 | Chang | H02J 3/34 323/284 |

(Continued)

FOREIGN PATENT DOCUMENTS

| EP | 2388881 A2 | 11/2011 |
| JP | 07-281767 A | 10/1995 |

(Continued)

*Primary Examiner* — Adam Houston
(74) *Attorney, Agent, or Firm* — Novick, Kim & Lee, PLLC; Jae Youn Kim (57) ABSTRACT

The present invention relates to a power duplication apparatus for an HVDC system and a control method therefor, and the power duplication apparatus for an HVDC system comprises: a first independent power generator receiving first input power so as to generate and output first power; a second independent power generator receiving second input power so as to generate and output the first power; a first power supplier selectively receiving the first power output, respectively, from the first independent power generator and the second independent power generator so as to convert the first power into second power having a smaller size than that of the first power and output the same; a second power supplier for selectively receiving the first power output, respectively, from the first independent power generator and the second independent power generator so as to convert the first power into the second power having a smaller size than that of the first power and output the same; a first HVDC controller for receiving the second power output from the first power supplier so as to activate the same and control an HVDC converter; a second HVDC controller for receiving (Continued)

the second power output from the second power supplier so as to activate the same and control the HVDC converter; and a power monitoring controller for enabling the first power output from the first independent power generator or the second independent power generator, so as to generate the first power having the same size as that of the first reference power if the first power has a size different from that of the first reference power by comparing the sizes of the first power and pre-stored first reference power, to be transferred to the first power supplier and second power supplier.

17 Claims, 5 Drawing Sheets

(51) Int. Cl.
  *H02J 1/10* (2006.01)
  *H02J 3/36* (2006.01)

(56) References Cited

U.S. PATENT DOCUMENTS

| | | | |
|---|---|---|---|
| 2005/0006956 A1* | 1/2005 | Shi | H02J 1/102 307/43 |
| 2008/0164761 A1* | 7/2008 | O'Bryant | H02J 9/061 307/66 |
| 2011/0148194 A1* | 6/2011 | Lai | H02J 7/0055 307/23 |
| 2015/0054343 A1* | 2/2015 | Cui | H02J 7/00 307/66 |
| 2015/0180232 A1* | 6/2015 | Mino | H02J 1/08 307/23 |
| 2016/0322824 A1* | 11/2016 | Park | H02J 3/36 |
| 2016/0329740 A1* | 11/2016 | Oh | H02J 7/007 |

FOREIGN PATENT DOCUMENTS

| | | |
|---|---|---|
| JP | 2011-125216 A | 6/2011 |
| KR | 10-2013-0115776 A | 10/2013 |
| KR | 10-1322617 B1 | 10/2013 |

\* cited by examiner

POWER DUPLICATION APPARATUS FOR HVDC SYSTEM AND CONTROL METHOD THEREFOR

TECHNICAL FIELD

The present invention generally relates to a power duplication apparatus for a High Voltage Direct Current (HVDC) system and a control method therefor, more particularly, to a power duplication apparatus for an HVDC system and a control method therefor, in which duplicate independent power source units, separated from a commercial power source, are provided, and which are capable of monitoring the operating states of the respective independent power source units, and are then selectively supplying power to duplicate HVDC controllers.

BACKGROUND ART

A High Voltage Direct Current (HVDC) system employs a method for overcoming power loss occurring in long-distance power transmission. Such an HVDC system uses a method for converting AC power, produced in a power station, into DC power, transmitting the DC power, and converting the DC power back into AC power so as to reduce power loss. The HVDC system is provided with an HVDC controller to control the overall transmission system. The HVDC controller must continue to perform its functions even if externally supplied power is interrupted. The HVDC controller is provided with a power monitoring device so as to be stably and continuously supplied with power, and the power monitoring device related to this technology is disclosed in Japanese Patent Application Publication NO. 1995-281767.

Japanese Patent Application Publication NO. 1995-281767 relates to a power device for supplying electricity in response to a requested load, and is composed of duplicate power supply sources, a subtraction means, a first control means, a second control means, and a selection means.

The duplicate power supply sources are composed of a first power supply source and a second power supply source to supply electricity corresponding to a requested load, and the subtraction means detects the electricity supplied from the first power supply source and subtracts a predetermined amount from the electricity supplied from the first power supply source when the detected electricity is equal to or greater than a preset value. The first control means controls the electricity supplied from the second power supply source based on the difference resulting from the subtraction by the subtraction means while controlling the electricity supplied from the first power supply source in response to a requested load. The second control means detects the electricity supplied from the first power supply source, and controls the electricity supplied from the second power supply source in response to the requested load when the detected electricity is less than or equal to a preset value. The selection means compares the electricity supplied from the second control means with the amounts of electricity supplied from the first and second power supply sources, selects the larger amount of electricity, and supplies the selected electricity to the load, thus supplying duplicate power.

The conventional technology, such as Japanese Patent Application Publication NO. 1995-281767, is configured to duplicate power sources using one commercial power source and one emergency power source. When these power sources are applied to an HVDC controller, if the one emergency power source is interrupted while the one commercial power source is interrupted, the HVDC controller cannot continue to perform its function. That is, a problem arises in that, when driving power is interrupted, the HVDC controller is incapable of controlling the overall HVDC system and thus is incapable of continuing to control high DC voltage transmission, thus seriously deteriorating the reliability of power transmission using the HVDC system.

DISCLOSURE

Technical Problem

Accordingly, the present invention has been made keeping in mind the above problems occurring in the prior art, and an object of the present invention is to provide a power duplication apparatus for an HVDC system and a control method therefor, in which duplicate independent power source units, separated from a commercial power source, are provided, and which may monitor the operating states of respective independent power source units and may selectively supply power to duplicate HVDC controllers.

Another object of the present invention is to provide a power duplication apparatus for an HVDC system and a control method therefor, which measure the lifespan of important elements provided in independent power sources when monitoring the operating states of independent power source units, thus monitoring whether a fault occurs in the independent power source units.

A further object of the present invention is to provide a power duplication apparatus for an HVDC system and a control method therefor, which monitor independent power source units using both the operating states of independent power source units and lifespan states of important elements, and selectively supply power to duplicate HVDC controllers, thus enabling power to be stably supplied.

Still another object of the present invention is to provide a power duplication apparatus for an HVDC system and a control method therefor, which can stably supply power to HVDC controllers, so that power can be continuously supplied to the HVDC controllers, thus improving the reliability of power transmission using an HVDC transmission system.

Technical Solution

A power duplication apparatus for a High Voltage Direct Current (HVDC) system according to the present invention includes a first independent power generator for receiving first input power and generating and outputting first power; a second independent power generator for receiving second input power and generating and outputting first power; a first power supply for selectively receiving the first power individually output from the first independent power generator and the second independent power generator, converting the received first power into second power having a magnitude less than that of the first power, and outputting the second power; a second power supply for selectively receiving the first power individually output from the first independent power generator and the second independent power generator, converting the received first power into second power having a magnitude less than that of the first power, and outputting the second power; a first HVDC controller configured to be activated by receiving the second power from the first power supply and to control an HVDC converter; a second HVDC controller configured to be activated by receiving the second power from the second power and to control the HVDC converter; and a power monitoring controller for comparing a magnitude of the first power with a magnitude of pre-stored first reference power, and for, when first power having a magnitude differing from the magnitude of the first reference power is present, allowing first power output from the first independent power generator or the second independent power generator, which generates the first power having a magnitude identical to that of the first reference power, to be transferred to the first power supply and the second power supply.

A power duplication control method for an HVDC system according to the present invention includes detecting, by a power monitoring controller, first power output from an Uninterrupted Power Supply (UPS); when the first power is detected, determining, by the power monitoring controller, whether the first power falls within a normal range matching a range of a preset first reference voltage; if it is determined that the first power does not fall within the normal range, switching over, by the power monitoring controller, a switch connected to the UPS so that first power output from a UPS provided in a first independent power generator that is normally operated, or first power output from a UPS provided in the second independent power generator is selected; when the switch is switched over, checking, by the power monitoring controller, whether the switch has completed a switchover operation; and returning to the switching over the switch when the switchover operation of the switch has not yet been completed.

Advantageous Effects

The power duplication apparatus for an HVDC system and the control method therefor the according to the present invention are advantageous in that duplicate independent power source units, separated from a commercial power source, are provided, and thereafter the operating states of respective independent power source units may be monitored and power may be selectively be provided to duplicate HVDC controllers, and are also advantageous in that the lifespan of important elements provided in independent power sources is measured when the operating states of independent power source units are monitored, thus monitoring whether a fault occurs in the independent power source units.

The power duplication apparatus for an HVDC system and the control method therefor according to the present invention are advantageous in that independent power source units are monitored using both the operating states of the independent power source units and lifespan states of important elements, and power is selectively supplied to duplicate HVDC controllers, thus enabling power to be stably supplied, and are also advantageous in that it is possible to stably supply power to HVDC controllers, so that power can be continuously supplied to the HVDC controllers, thus improving the reliability of power transmission using an HVDC transmission system.

BEST MODE

Hereinafter, preferred embodiments of the present invention will be described in detail with reference to the attached drawings. In the description of the present invention, detailed descriptions of known functions or configurations which have been deemed to make the gist of the present invention unnecessarily obscure will be omitted below.

Figure 1:
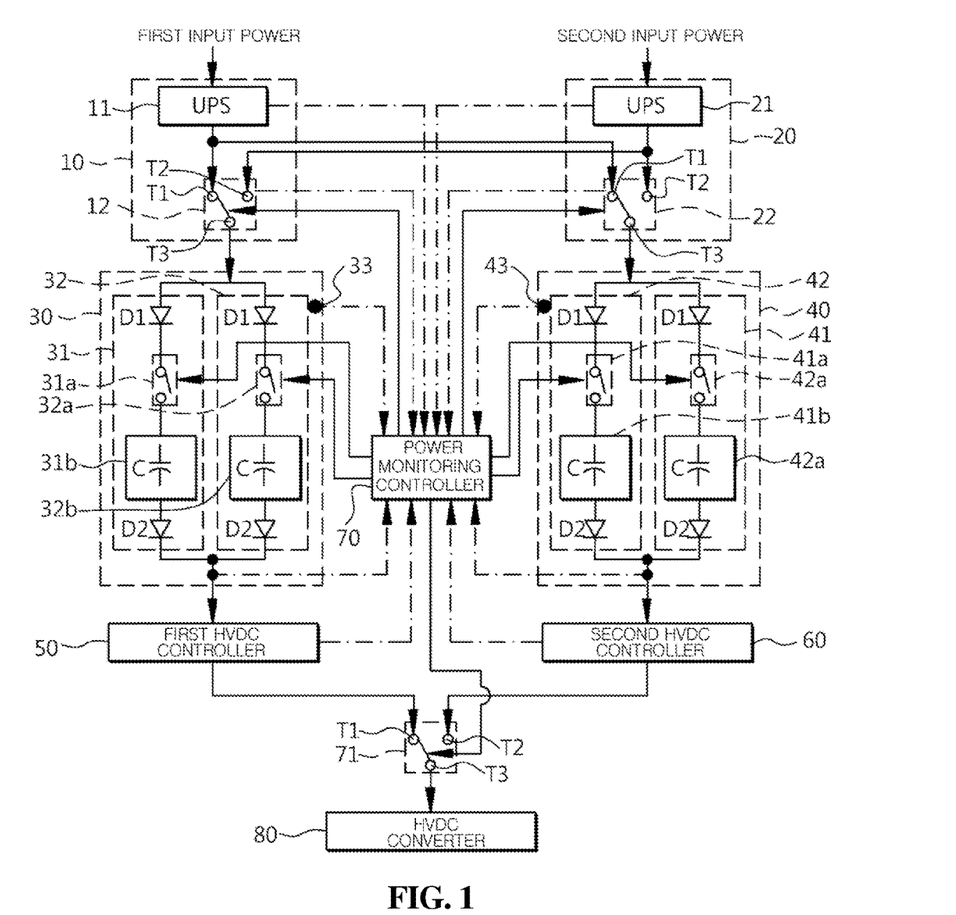
FIG. 1 is a block diagram showing the configuration of a power duplication apparatus for an HVDC system according to the present invention.

As shown in FIG. 1, a duplicate power monitoring apparatus for HVDC controllers 50 and 60 according to the present invention includes a first independent power generator 10, a second independent power generator 20, a first power supply 30, a second power supply 40, a first HVDC controller 50, a second HVDC controller 60, and a power monitoring controller 70.

The first independent power generator 10 receives first input power and generates and outputs first power, and the second independent power generator 20 receives second input power and generates and outputs first power. The first power supply 30 selectively receives the first power individually output from the first independent power generator 10 and the second independent power generator 20, converts the first power into second power having a magnitude less than that of the first power, and outputs the second power. The second power supply 40 selectively receives the first power, individually output from the first independent power generator 10 and the second independent power generator 20, converts the first power into second power having a magnitude less than that of the first power, and outputs the second power. The first HVDC controller 50 is activated by receiving the second power, output from the first power supply 30, to control an HVDC converter, and the second HVDC controller 60 is activated by receiving the second power, output from the second power supply 40, to control an HVDC converter 80. The power monitoring controller 70 compares the magnitude of the first power with the magnitude of pre-stored first reference power, and when the magnitude of the first power differs from the magnitude of the first reference power, allows the first power output from the first independent power generator 10 or the second independent power generator 20, which generates the first power having the magnitude identical to that of the first reference power, to be transferred both to the first power supply 30 and to the second power supply 40.

The configuration of the duplicate power monitoring apparatus for HVDC controllers 50 and 60 according to the present invention having the above configuration will be described in detail below.

The first independent power generator 10 and the second independent power generator 20 use either power generated from a power network (not shown), with which the first HVDC controller 50 and the second HVDC controller 60 are associated, or power generated from a power network, with which the first HVDC controller 50 and the second HVDC controller 60 are not associated, as each of the first input power and the second input power which are respectively received thereto. For example, when the first independent power generator 10 uses, as the first input power, the power generated from the power network, with which the first HVDC controller 50 and the second HVDC controller 60 are associated, the second independent power generator 20 uses, as the second input power, the power generated from the power network (not shown), with which the first HVDC controller 50 and the second HVDC controller 60 are not associated.

Each of the first independent power generator 10 and the second independent power generator 20, which are supplied with the first input power and the second input power, which are independent of each other, is composed of an Uninterrupted Power Supply (UPS) 11 or 21 and a switch 12 or 22.

The UPS 11 or 21 is charged by receiving the first input power or the second input power, generates the first power from the charged first input power or second input power, and outputs the first power, and the detailed configuration thereof is omitted because a well-known UPS equipped with a battery (not shown) is used as the UPS.

The switch 12 or 22 receives first power, individually output from the UPS 11 or 21 to which the first input power is input or from the UPS 11 or 21 to which the second input power is input, is switched over under the control of the power monitoring controller 70, and then outputs the first power to the first power supply 30 or the second power supply 40, wherein each of the switches 12 and 22 includes a first contact terminal T1, a second contact terminal T2, and a third contact terminal T3. The first contact terminal T1 is connected to the UPS 11 provided in the first independent power generator 10, the second contact terminal T2 is connected to the UPS 21 provided in the second independent power generator 20, and the third contact terminal T3 is connected to the first power supply 30 or the second power supply 40, and is then switched over and selectively connected to the first contact terminal T1 or the second contact terminal T2 under the control of the power monitoring controller 70.

As shown in FIG. 1, each of the first power supply 30 and the second power supply 40 is composed of a first Switching Mode Power Supply (SMPS) unit 31 or 41 and a second SMPS unit 32 or 42.

The first SMPS units 31 and 41 are provided in the first power supply 30 and the second power supply 40, respectively, and are configured to receive the first power, which is output from the first independent power generator 10 or the second independent power generator 20, convert the first power into second power under the control of the power monitoring controller 70, and output the second power. The second SMPS units 32 and 42 are provided in the first power supply 30 and the second power supply 40, respectively, are arranged in parallel with the first SMPS units 31 and 41, respectively, and are configured to receive the first power, convert the first power into second power under the control of the power monitoring controller 70, and output the second power.

The first SMPS units 31 and 41 or the second SMPS units 32 and 42 are composed of switches 31a and 41a or 32a and 42a, SMPSs 31b and 41b or 32b and 42b, and first diodes D1 or second diodes D2, respectively.

The switches 31a and 41a or 32a and 42a are provided in the first SMPS units 31 and 41 or the second SMPS units 32 and 42, and are configured to receive the first power, output from the first independent power generator 10 or the second independent power generator 20, and turn on or off the output of the first power under the control of the power monitoring controller 70, wherein each of the switches 31a, 41a, 32a, and 42a is provided with a first contact terminal T1 and a second contact terminal T2. The first contact terminal T1 provided in each of the switches 31a, 41a, 32a, and 42a is connected to the corresponding first diode D1, and the second contact terminal T2 is connected to the corresponding SMPS 31b, 41b, 32b, or 42b, and is then connected to the first contact terminal T1 under the control of the power monitoring controller 70. That is, in the switch 31a, 41a, 32a, or 42a, the first contact terminal T1 and the second contact terminal T2 are switched over to turn on or off the first power under the control of the power monitoring controller 70.

Figure 2:
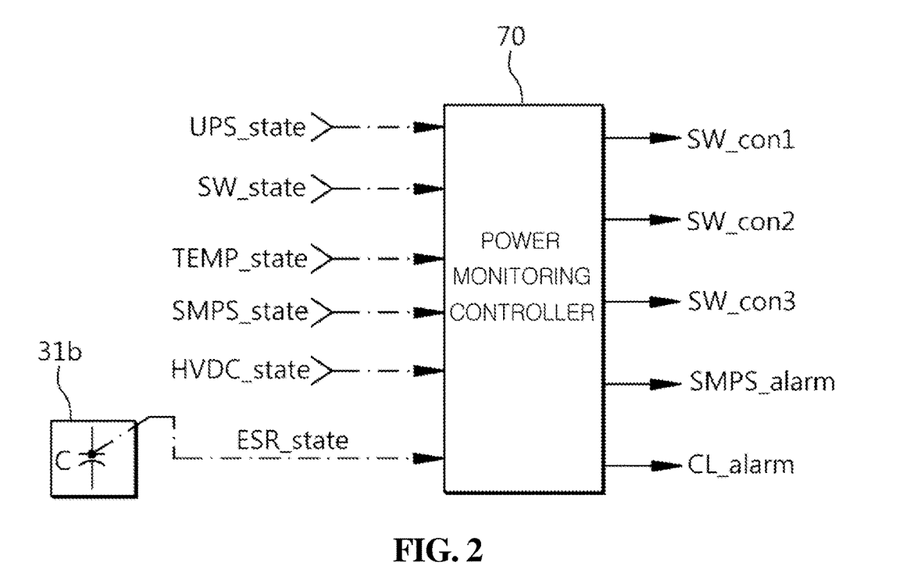
FIG. 2 is a block diagram showing in detail input/output signals of the power monitoring controller shown in FIG. 1.

The SMPS 31b and 41b or 32b and 42b are respectively provided in the first SMPS units 31 and 41 or the second SMPS units 32 and 42, and are configured to receive the first power output from the switches 31a and 41a or 32a and 42a, convert the first power into second power, and output the second power to the first HVDC controller 50 or the second HVDC controller 60. Each of the SMPS 31b, 41b, 32b, and 42b is provided with a capacitor C, the lifespan of which is measured by the power monitoring controller 70 using equivalent series resistance characteristics. That is, as shown in FIG. 2, the power monitoring controller 70 measures the lifespan of each capacitor C by measuring equivalent series resistance characteristics that indicate the degraded state of the capacitor C, wherein a measurement device or method therefor is implemented using well-known technology.

The first diodes D1 are connected to the switches 31a, 41a, 32a, and 42a, respectively, and are configured to prevent current from flowing from the SMPSs 31b, 41b, 32b, and 42b into the first independent power generator 10 due to counter electromotive force. The second diodes D2 are respectively connected to the SMPSs 31b, 41b, 32b, and 42b and are configured to prevent current from flowing from the first HVDC controller 50 or the second HVDC controller 60 into the SMPSs 31b, 41b, 32b, and 42b due to counter electromotive force.

The first HVDC controller 50 and the second HVDC controller 60 are disposed between the second diodes D2 and a switch 71 so that they are individually driven by receiving the second power, as shown in FIG. 1, thus controlling a single HVDC converter 80 in a duplicate manner. Further, the first HVDC controller 50 and the second HVDC controller 60 activate the HVDC converter 80 by controlling a circuit device (not shown) connected to the HVDC converter 80 in a duplicate manner, that is, by controlling the overall operation of the circuit device related to the single HVDC converter 80, thus enabling high DC voltage to be stably transmitted.

The power monitoring controller 70 is provided with the switch 71, wherein the switch 71 has a first contact terminal T1, a second contact terminal T2, and a third contact terminal T3. The first contact terminal T1 is connected to the first HVDC controller 50, the second contact terminal T2 is connected to the second HVDC controller 60, and the third contact terminal T3 is connected to the HVDC converter and is selectively connected to the first contact terminal T1 or the second contact terminal T2 under the control of the power monitoring controller 70, and thus the switch 71 is switched over under the control of the power monitoring controller 70, with the result that the HVDC converter 80 is stably controlled in a duplicate manner owing to the first HVDC controller 50 or the second HVDC controller 60.

When comparing the magnitude of the first power with the magnitude of the first reference power, the power monitoring controller 70 compares the current amounts or voltage levels of the first power and the first reference power with each other. As shown in FIGS. 1 and 2, the power monitoring controller 70 controls the overall operations of the two independent power source units 10, 30 and 20, 40, which are independent of a commercial power source and are independent of each other so that the second power is stably supplied to the first HVDC controller 50 or the second HVDC controller 60. The independent power source unit 10, 30 is composed of the first independent power generator 10 and the first power supply 30, and the independent power source unit 20, 40 is composed of the second independent power generator 20 and the second power supply 40.

A monitoring method using the duplicate power monitoring apparatus for the HVDC controllers 50 and 60 according to the present invention having the above configuration will be described in detail below with reference to FIGS. 3 to 5.

Figure 3:
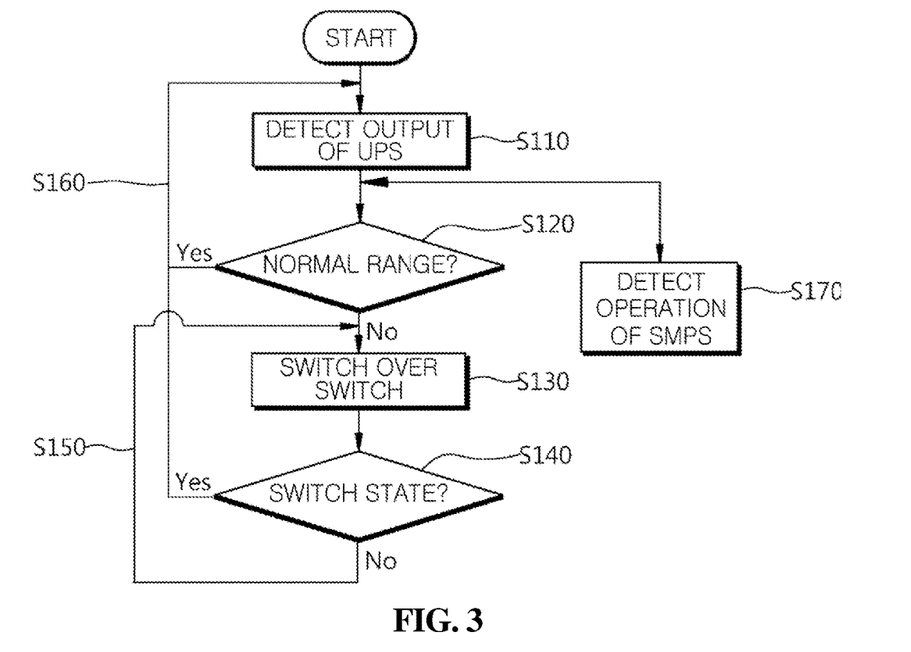
FIG. 3 is a flowchart showing a power duplication control method for an HVDC system according to the present invention.

As shown in FIG. 3, in the duplicate power monitoring method for the HVDC controllers 50 and 60 according to the present invention, the power monitoring controller 70 detects first power output from the UPS 11 or 21 (S110). The detection of the first power is performed such that, as shown in FIG. 2, the power monitoring controller 70 detects a UPS state detection signal UPS_state, wherein the UPS state detection signal UPS_state is obtained by detecting the power state of a battery (not shown) provided in the UPS 11 or 21 or the output state of the first power output from the UPS 11 or 21.

When the first power is detected, the power monitoring controller 70 determines whether the first power falls within a normal range matching that of a preset first reference voltage (S120).

When the first power does not fall within the normal range, the power monitoring controller 70 switches over the switch 12 or 22 connected to the UPS 11 provided in the first independent power generator 10 or the UPS 11 provided in the second independent power generator 20 so that the first power output from the UPS 11 or 21 is selected (S130).

As shown in FIG. 2, the power monitoring controller 70 receives the first power in response to the UPS state detection signal UPS_state or detects the power state of the battery (not shown) provided in the UPS 11 or 21, generates a first switchover signal SW_con1 when the detected first power does not fall within the normal range, and switches over the switch 12 or 22, thus enabling the first power, input as the normal power, to be supplied to the first power supply 30 and the second power supply 40 through the switch 12 or 22. The normal range for the first power is set when the power monitoring controller 70 is programmed, and the preset first reference voltage is set to 90% or more of the first power when the first power is set to 100%, and thus it is determined whether the first power falls within the normal range in which the first power reaches the first reference voltage. In contrast, when the first power falls within the normal range, the process returns to the previous step so as to continuously monitor the first power output from the UPS 11 or 21 (S160).

When the switch 12 or 22 is switched over, the power monitoring controller 70 performs a switch state checking operation of checking whether the switch 12 or 22 has completed the switchover operation (S140). The checking of the state of the switch 12 or 22 is performed by detecting currents flows or potential differences between the first contact terminal T1 and the third contact terminal T3 and between the second contact terminal T2 and the third contact terminal T3 provided in each of the switches 12 and 22 and by allowing the power monitoring controller 70 to receive the results of detection as a switch state signal SW_state. As a result of checking the switch state, if the switch 12 or 22 does not normally complete the switchover operation, the process returns to the step S13 of switching over the switch 12 or 22 so as to perform again a switchover operation for the switch 12 or 22 (S150), whereas if the switch 12 or 22 normally completes the switchover operation, the process returns to the step S110 of detecting the output state of the first power output from the UPS 11 or 21 so as to continuously detect the first power output from the UPS 11 or 21 (S160). The checking of the switchover operation for the switch 12 or 22 is intended to more stably supply power to the first HVDC controller 50 or the second HVDC controller 60 by checking whether each switch 12 or 22 has been normally operated.

At the step S110 of determining whether the first power falls within the normal range, an interrupt routine S170 of periodically checking whether the SMPS 31b, 41b, 32b, or 42b is normally operated is performed so that determination is performed at regular time intervals when determining whether the first power falls within the normal range (S170).

Figure 4:
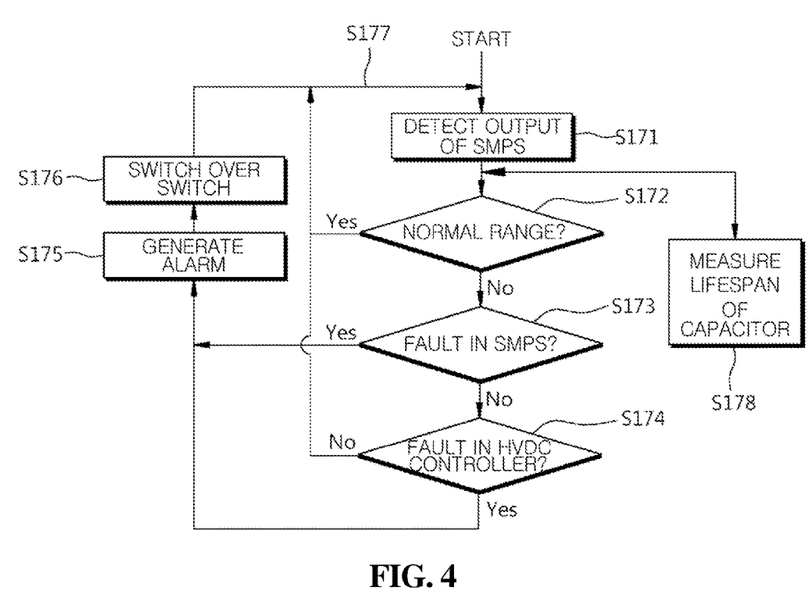
FIG. 4 is a flowchart showing in detail the interrupt routine step shown in FIG. 3.

The interrupt routine of checking whether the SMPS 31b, 41b, 32b, or 42b is normally operated is configured such that, as shown in FIG. 4, the power monitoring controller 70 determines whether the second power output from the SMPS 31b, 41b, 32b, or 42b falls within a normal range matching that of the preset second reference voltage (S171). The normal range for the second power is preset when the power monitoring controller 70 is programmed, and the preset second reference voltage is set to 90% or more of the second power when the second power is set to 100%, and thus it is determined whether the second power falls within the normal range in which the second power reaches the second reference voltage.

When the second power does not fall within the normal range, the power monitoring controller 70 checks whether a fault occurs in the SMPS 31b, 41b, 32b or 42b (S172). The checking of whether a fault occurs in the SMPS 31b, 41b, 32b, or 42b is performed by checking the output current of a semiconductor switching element (not shown) provided in the SMPS 31b, 41b, 32b, or 42b, and a method for detecting the output of the semiconductor switching element (not shown) is implemented using well-known technology. The power monitoring controller 70 stores the output of the semiconductor switching element in advance, determines whether a current output value, output from the semiconductor switching element, is not a preset value, determines that a fault occurs if the current output value is not the preset value. The power monitoring controller 70 receives and determines the current output value as an SMPS state signal SMPS_state, as shown in FIG. 2.

If, as a result of the checking by the power monitoring controller 70, a fault occurs in the SMPS 31b, 41b, 32b, or 42b, the power monitoring controller 70 generates an alarm SMPS_alarm (S175). After generating the alarm SMPS_alarm, the power monitoring controller 70 switches over the switch 31a, 32a, 41a, or 42a so that the second power output from the normally operated SMPS 31b, 41b, 32b, or 42b is applied to the first HVDC controller 50 or the second HVDC controller 60 (S176). The switchover of the switch 31a, 32a, 41a, or 42a is performed such that, as shown in FIG. 2, the power monitoring controller 70 generates a second switchover signal SW_con2 so that the switch is opened, and applies the second switch control signal to the switch 31a, 32a, 41a, or 42a. That is, the first power is prevented from being supplied to the SMPS 31b, 41b, 32b, or 42b that is not normally operated, so that an alarm is generated for the SMPS 31b, 41b, 32b, or 42b that is not normally operated and the SMPS is blocked, thus stably applying the second power to the first HVDC controller 50 or the second HVDC controller 60, and thus enabling the SMPS 31b, 41b, 32b, or 42b which is not normally operated to be promptly repaired.

If, as a result of checking whether a fault occurs in the SMPS 31b, 41b, 32b, or 42b, no fault occurs in the SMPS 31b, 41b, 32b, or 42b, the power monitoring controller 70 checks whether a fault occurs in the first HVDC controller 50 or the second HVDC controller 60 (S174). The checking of whether a fault occurs in the first HVDC controller 50 or the second HVDC controller 60 is programmed such that, when the first HVDC controller 50 or the second HVDC controller 60 is not normally operated, an HVDC abnormal state signal HVDC_state is individually generated in the first HVDC controller 50 or in the second HVDC controller 60. When the HVDC abnormal state signal HVDC_state is generated, the power monitoring controller 70 receives this signal, and generates and outputs an alarm (S175).

When an alarm is generated by the power monitoring controller 70, the power monitoring controller 70 switches over the switch 17 to which the first HVDC controller 50 and the second HVDC controller 60 are connected so that the normally operated first HVDC controller 50 or second HVDC controller 60 is selected (S176). That is, when the fault occurs in the first HVDC controller 50, the power monitoring controller 70 generates and outputs a third switchover signal SW_con3 by connecting the second contact terminal T2 and the third contact terminal T3 of the switch 17 to each other. The switchover of the switch 17 is also determined by a temperature sensing signal TEMP_state detected by each of temperature sensors 33 and 43 provided in the first power supply 30 and the second power supply 40. When the temperature sensing signal TEMP_state, output from each of the temperature sensors 33 and 43, is greater than a temperature value preset in the power monitoring controller 70, the power monitoring controller 70 generates a third switchover signal SW_con3, thus stopping the operation of the first HVDC controller 50 or the second HVDC controller 60. That is, prompt repair may be performed by stopping the operation of the first power supply 30 or the second power supply 40 in which high temperature abnormally occurs, and the operation of the first HVDC controller 50 or the second HVDC controller 60 connected to the abnormal first power supply 30 or second power supply 40 is stopped by stopping the operation of the first power supply 30 or the second power supply 40 in which high temperature abnormally occurs, thus enabling the HVDC converter 80 to be continuously and stably controlled.

At the step S172 of determining whether the second power falls within a normal range matching the range of the preset second reference voltage, an interrupt routine for measuring the lifespan of the capacitor C at regular time intervals, that is, periodically, is performed (S178).

Figure 5:
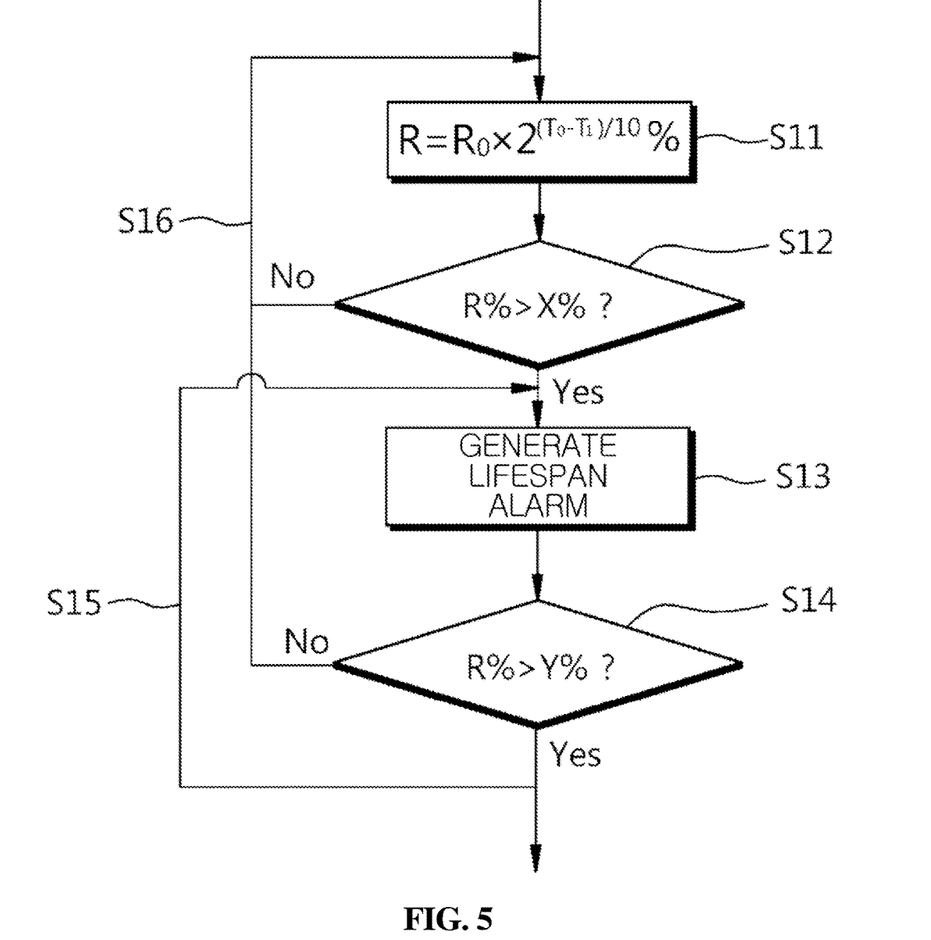
FIG. 5 is a flowchart showing in detail the interrupt routine step shown in FIG. 4.

As shown in FIG. 5, the interrupt routine S178 is performed such that, when each of the SMPS s 31b, 41b, 32b, and 42b is normally operated, the lifespan of the capacitor C provided in each of the SMPSs 31b, 41b, 32b, and 42b is periodically measured, and an alarm is provided against the deterioration of performance or lifespan of the capacitor C, which is important element of the SMPS 31b, 41b, 32b, or 42b.

The measurement of the lifespan of the capacitor C is performed using an equation of $R=R0\times 2^{(T0-T1)/10}\%$ (S11). The lifespan of the capacitor C is measured using equivalent series resistance characteristics indicating the degraded state of the capacitor C, and R in the equation of $R=R0\times 2^{(T0-T1)/10}\%$ is the measured lifespan of the capacitor. In the equation, R0 is the guaranteed product lifespan, which is guaranteed by the manufacturer of the capacitor C, T1 is the time during which the capacitor C has been used to date, and T0 is a warranty period guaranteed by the manufacturer of the capacitor C.

When R % is measured, whether R % is greater than X % preset in the power monitoring controller 70 is determined (S12). When determining whether R % is greater than X %, X is set to 80 to 90% of R when R is 100%. When R % is greater than X %, the power monitoring controller 70 primarily generates a lifespan alarm CL_alarm for the capacitor C, as shown in FIG. 2 (S13).

When the measured R % is greater than X %, the power monitoring controller 70 generates the lifespan alarm CL_alarm using an output element (not shown), such as a buzzer or a warning light provided in the power monitoring controller 70, so that a manager who manages the first HVDC controller 50, the second HVDC controller 60 or the HVDC converter 80 recognizes the alarm. When the lifespan alarm CL_alarm is primarily generated, the manager may determine that the degradation of the capacitor C provided in each of the SMPSs 31b, 41b, 32b, and 42b progresses to some degree, thus enabling the remaining lifespan of the capacitor C to be predicted. In contrast, when R % is less than X %, the process returns to the step S11 of measuring the lifespan of the capacitor C (S16).

When the measured R % is greater than X %, the power monitoring controller 70 checks whether R % is greater than Y %, which is set to be greater than X % (S14). Here, Y is set to 90 to 98% of R when R is 100%, and X and Y values are either input at the time of programming the power monitoring controller 70 or personally input by the manager who manages the HVDC converter 80 using an input device (not shown) such as a keyboard. As a result of checking whether R % is greater than Y %, if R % is less than Y %, the power monitoring controller 70 returns to the step S11 of measuring the lifespan of the capacitor C (S16). In contrast, when R % is greater than Y %, the process returns to the step S13 of generating a lifespan alarm CL_alarm (S15).

When R % is greater than Y %, and a secondary alarm CL_alarm is produced, the manager immediately replaces the SMPS 31b, 41b, 32b, or 42b, or recognizes that the last maintenance period for repairing the capacitor C in the SMPS 31b, 41b, 32b, or 42b has been reached. The secondary alarm CL_alarm is set differently, in the frequency of the buzzer or the interval for the indication of the warning light, from the alarm CL_alarm produced in primary detection, thus allowing the manager to immediately recognize the alarm. When the secondary alarm CL_alarm is produced, the manager must immediately repair the SMPS 31b, 41b, 32b, or 42b or the capacitor C when recognizing the alarm because the alarm is produced immediately before the lifespan of the capacitor C becomes zero.

The power monitoring controller 70 may measure the lifespan of each capacitor C, and prevent the occurrence of a sudden error in the SMPS 31b, 41b, 32b, or 42b caused by the capacitor C, thus eliminating errors in the SMPS 31b, 41b, 32b, and 42b and stably supplying the second power to the first HVDC controller 50 or the second HVDC controller 60. Each of the first HVDC controller 50 and the second HVDC controller 60 may be stably and continuously provided with second power and may then be operated because the power monitoring controller 70 measures the output states of the UPSs 11 and 21 and the SMPSs 31b, 41b, 32b, and 42b or the lifespan of the capacitors C provided in the SMPSs 31b, 41b, 32b, and 42b, and generates an alarm for the manager to perform maintenance before an error occurs.

The first HVDC controller 50 and the second HVDC controller 60 may be stably and continuously provided with second power from two independent power source units 10, 30 and 20, 40, which receive independent first input power and second input power under the control of the power monitoring controller 70, thus rapidly activating the HVDC converter 80 when the HVDC converter 80 stops operation and then resumes operation, with the result that reliability of the transmission of power by an HVDC system (not shown) may be improved.

As described above, the power duplication apparatus for the HVDC system and the control method therefor according to the present invention may be configured such that duplicate independent power source units, separated from a commercial power source, are provided, and thereafter the operating states of respective independent power source units may be monitored and power may be selectively provided to duplicate HVDC controllers, and such that the lifespan of important elements provided in independent power sources is measured when the operating states of independent power source units are monitored, thus monitoring whether a fault occurs in the independent power source units. Furthermore, the power duplication apparatus for an HVDC system and the control method therefor according to the present invention are configured such that independent power source units are monitored using both the operating states of the independent power source units and lifespan states of important elements, and power is selectively supplied to duplicate HVDC controllers, thus enabling power to be stably supplied, and are also advantageous in that it is possible to stably supply power to HVDC controllers, so that power can be continuously supplied to the HVDC controllers.

Although the present invention has been described in detail with reference to preferred embodiments, it should be noted that the present invention is not limited to the description of these embodiments. Those skilled in the art will appreciate that, although not presented in embodiments, various changes or modifications of the present invention are possible without departing from the scope and spirit of the invention as disclosed in the accompanying claims, and it is apparent that those changes or modifications belong to the technical scope of the present invention. Therefore, the technical protection scope of the present invention should be defined by the technical spirit of the accompanying claims.

The invention claimed is:

1. A power duplication apparatus for a High Voltage Direct Current (HVDC) system, comprising:
    a first independent power generator for receiving first input power and generating and outputting first power;
    a second independent power generator for receiving second input power and generating and outputting first power;
    a first power supply for selectively receiving the first power individually output from the first independent power generator and the second independent power generator, converting the received first power into second power having a magnitude less than that of the first power, and outputting the second power;
    a second power supply for selectively receiving the first power individually output from the first independent power generator and the second independent power generator, converting the received first power into second power having a magnitude less than that of the first power, and outputting the second power;
    a first HVDC controller configured to be activated by receiving the second power from the first power supply and to control an HVDC converter;
    a second HVDC controller configured to be activated by receiving the second power from the second power supply and to control the HVDC converter; and
    a power monitoring controller for comparing a magnitude of the first power with a magnitude of pre-stored first reference power, and for, when first power having a magnitude differing from the magnitude of the first reference power is present, allowing first power output from the first independent power generator or the second independent power generator, which generates the first power having a magnitude identical to that of the first reference power, to be transferred to the first power supply and the second power supply.

2. The power duplication apparatus of claim 1, wherein each of the first independent power generator and the second independent power generator comprises:
    an Uninterrupted Power Supply (UPS) configured to be charged by receiving the first input power or the second input power, generate the first power from the charged first input power or second input power, and output the first power; and
    a switch configured to individually receive the first power from the UPS to which the first input power is input or the UPS to which the second input power is input, and to be switched over under control of the power monitoring controller, thus outputting the first power to the first power supply or the second power supply.

3. The power duplication apparatus of claim 2, wherein:
    the switch includes a first contact terminal, a second contact terminal, and a third contact terminal,
    wherein the first contact terminal is connected to the UPS provided in the first independent power generator, the second contact terminal is connected to the UPS provided in the second independent power generator, and the third contact terminal is connected to the first power supply or the second power supply and is selectively connected to the first contact terminal or the second contact terminal under control of the power monitoring controller.

4. The power duplication apparatus of claim 1, wherein the first independent power generator and the second independent power generator use, as the first input power or the second input power, power generated from a power network with which the first HVDC controller and the second HVDC controller are associated, or power generated from a power network with which the first HVDC controller and the second HVDC controller are not associated.

5. The power duplication apparatus of claim 1, wherein each of the first power supply and the second power supply comprises:
    a first Switching Mode Power Supply (SMPS) unit configured to individually receive the first power supplied from the first independent power generator or the first power supplied from the second independent power generator, convert the first power into second power, and outputting the second power under control of the power monitoring controller; and
    a second SMPS unit arranged in parallel with the first SMPS unit, and configured to receive the first power, convert the first power into second power and output the second power under control of the power monitoring controller.

6. The power duplication apparatus of claim 1, wherein each of the first SMPS unit and the second SMPS unit comprises:
    a switch configured to receive the first power output from the first independent power generator or the second independent power generator, and turn on or off output of the first power under control of the power monitoring controller;

an SMPS configured to receive the first power from the switch, convert the first power into the second power, and output the second power to the first HVDC controller or the second HVDC controller;

a first diode connected to the switch and configured to prevent current from flowing from the SMPS into the first independent power generator due to counter electromotive force; and a second diode connected to the SMPS and configured to prevent current from flowing from the first HVDC controller or the second HVDC controller into the SMPS due to counter electromotive force.

7. The power duplication apparatus of claim 1, wherein:
the switch includes a first contact terminal and a second contact terminal,
the first contact terminal is connected to the first diode, and the second contact terminal is connected to the SMPS and is then connected to the first contact terminal under control of the power monitoring controller.

8. The power duplication apparatus of claim 7, wherein the SMPS comprises a capacitor, a lifespan of which is measured by the power monitoring controller using equivalent series resistance characteristics.

9. The power duplication apparatus of claim 1, wherein the power monitoring controller is configured to, when comparing a magnitude of the first power with a magnitude of the first reference power, compare current amounts or voltage levels of the first power and the first reference power with each other.

10. The power duplication apparatus of claim 1, wherein the power monitoring controller comprises a switch, which includes a first contact terminal, a second contact terminal, a third contact terminal,
wherein the first contact terminal is connected to the first HVDC controller, the second contact terminal is connected to the second HVDC controller, and the third contact terminal is connected to the HVDC converter and is then selectively connected to the first contact terminal or the second contact terminal under control of the power monitoring controller.

11. A power duplication control method for an HVDC system, comprising:
detecting, by a power monitoring controller, first power output from an Uninterrupted Power Supply (UPS);
when the first power is detected, determining, by the power monitoring controller, whether the first power falls within a normal range matching a range of a preset first reference voltage;
if it is determined that the first power does not fall within the normal range, switching over, by the power monitoring controller, a switch connected to the UPS so that first power output from a UPS provided in a first independent power generator that is normally operated, or first power output from a UPS provided in the second independent power generator is selected;
when the switch is switched over, checking, by the power monitoring controller, whether the switch has completed a switchover operation; and
returning to the switching over the switch when the switchover operation of the switch has not yet been completed.

12. The power duplication control method of claim 11, further comprising, when the switchover operation of the switch has been completed at the checking whether the switch has completed the switchover operation:
returning to the detecting the first power output from the UPS if the switchover operation has been completed.

13. The power duplication control method of claim 11, wherein:
determining whether the first power falls within the normal range comprises an interrupt routine operation of periodically checking whether an SMPS is normally operated when determining whether the first power falls within a normal range;
the interrupt routine operation of checking whether the SMPS is normally operated comprises:
determining, by the power monitoring controller, whether second power output from the SMPS falls within a normal range matching a range of a preset second reference voltage;
if the second power does not fall within the normal range, checking, by the power monitoring controller, whether a fault occurs in the SMPS;
if it is checked that no fault occurs in the SMPS, checking, by the power monitoring controller, whether a fault occurs in a first HVDC controller or a second HVDC controller;
if it is checked that a fault occurs in the SMPS or that a fault occurs in the first HVDC controller or the second HVDC controller, generating, by the power monitoring controller, an alarm; and
when the alarm is generated, switching over, by the power monitoring controller, a switch to which the SMPS is connected or a switch to which the first HVDC controller and the second HVDC controller are connected so that the SMPS that is normally operated and the first HVDC controller or the second HVDC controller that is normally operated are selected.

14. The power duplication control method of claim 13, wherein checking whether the second power falls within a normal range matching the range of the preset second reference voltage comprises:
performing an interrupt routine operation of periodically measuring a lifespan of a capacitor provided in the SMPS when the SMPS is normally operated,
wherein the interrupt routine operation of measuring the lifespan of the capacitor comprises:
measuring the lifespan of the capacitor by solving an equation of $R=R0\times 2^{(T0-T1)/10}\%$;
checking whether R % is greater than X % preset in the power monitoring controller;
when R % is greater than X %, generating, by the power monitoring controller, a lifespan alarm for the capacitor;
checking, by the power monitoring controller, whether R % is greater than Y %, which is set to be greater than the X %; and
returning to the generating the lifespan alarm when R % is greater than Y %,
wherein in the equation $R=R0\times 2^{(T0-T1)/10}\%$, R is a measured lifespan of the capacitor, R0 is a guaranteed product lifespan of the capacitor, and T1 is a time during which the capacitor C is used to date, and T0 is a warranty period for the capacitor.

15. The power duplication control method of claim 14, wherein measuring the lifespan of the capacitor is configured to measure the lifespan of the capacitor using equivalent series resistance characteristics indicating a degraded state of the capacitor.

16. The power duplication control method of claim 14, wherein at checking whether R % is greater than X %, X is set to 80 to 90% of R when R is 100%.

17. The power duplication control method of claim 14, wherein at checking whether R % is greater than Y %, Y is set to 90 to 98% of R when R is 100%.

* * * * *